US009271505B2

(12) United States Patent
Christopher et al.

(10) Patent No.: US 9,271,505 B2
(45) Date of Patent: Mar. 1, 2016

(54) APPARATUS FOR CONVEYING, INSPECTING AND STACKING ITEMS

(71) Applicants: David Christopher, Wabash, IN (US); Gregory C. Stroud, Huntington, IN (US)

(72) Inventors: David Christopher, Wabash, IN (US); Gregory C. Stroud, Huntington, IN (US)

(73) Assignee: Shuttleworth LLC, Huntington, IN (US)

( * ) Notice: Subject to any disclaimer, the term of this patent is extended or adjusted under 35 U.S.C. 154(b) by 25 days.

(21) Appl. No.: 14/198,013

(22) Filed: Mar. 5, 2014

(65) Prior Publication Data

US 2014/0262682 A1    Sep. 18, 2014

Related U.S. Application Data

(60) Provisional application No. 61/789,015, filed on Mar. 15, 2013.

(51) Int. Cl.
| | |
|---|---|
| *B07C 5/34* | (2006.01) |
| *A21C 15/00* | (2006.01) |
| *B07C 5/38* | (2006.01) |
| *B65G 47/68* | (2006.01) |
| *B65G 57/03* | (2006.01) |
| *B65G 57/11* | (2006.01) |
| *B07C 5/342* | (2006.01) |

(52) U.S. Cl.
CPC . *A21C 15/00* (2013.01); *B07C 5/38* (2013.01); *B65G 47/681* (2013.01); *B65G 57/03* (2013.01); *B65G 57/11* (2013.01); *B07C 5/342* (2013.01)

(58) Field of Classification Search
CPC ...... B07C 5/342; B07C 5/3422; B07C 5/361; B07C 5/38; B07C 5/367; B07C 5/368; B07C 2501/0081; A21C 15/00; B65G 57/03; B65G 57/11; B65G 47/52
USPC .......................................... 209/576, 923, 933
See application file for complete search history.

(56) References Cited

U.S. PATENT DOCUMENTS

| | | | |
|---|---|---|---|
| 3,392,853 | A | 7/1968 | Mitchel et al. |
| 3,525,443 | A | 8/1970 | Pomara, Jr. |
| 3,759,402 | A | 9/1973 | Hitch et al. |
| 3,915,316 | A | 10/1975 | Pomara, Jr. |
| 4,006,831 | A | 2/1977 | Jimenez |
| 4,530,632 | A | 7/1985 | Sela |
| 4,620,826 | A * | 11/1986 | Rubio et al. ............... 414/793.1 |
| 5,253,762 | A | 10/1993 | Duncan |
| 5,526,437 | A * | 6/1996 | West ........................... 382/141 |
| 5,601,397 | A | 2/1997 | Lope et al. |
| 5,659,624 | A | 8/1997 | Fazzari et al. |

(Continued)

*Primary Examiner* — Joseph C Rodriguez
(74) *Attorney, Agent, or Firm* — Thompson Hine LLP

(57) ABSTRACT

A machine for inspecting, sorting and stacking items includes a plurality of conveyor lanes for moving items through the machine. An imaging system is arranged relative to the conveyor lanes to view items moving along the conveyor lanes. A reject arrangement is downstream of the imaging system and includes a plurality of selectively actuatable reject mechanisms, each reject mechanism associated with a respective one of the conveyor lanes enabling items to be selectively dropped from each conveyor lane on an individual lane basis. Items that pass inspection are conveyed to a downstream stacker, then on to item stack conveyors before being moved onto a side transfer conveyor. A controller analyzes image data to make a determination of whether any item is below a defined quality threshold and, if so, to control the reject mechanism to drop the below quality item out of the conveyor lane.

16 Claims, 9 Drawing Sheets

(56) References Cited

U.S. PATENT DOCUMENTS

| | | |
|---|---|---|
| 5,720,593 A | 2/1998 | Pleake |
| 5,763,861 A | 6/1998 | Herrera et al. |
| 5,842,557 A * | 12/1998 | Montemayor et al. ..... 198/418.1 |
| 6,053,695 A | 4/2000 | Longoria et al. |
| 6,168,370 B1 | 1/2001 | Longoria et al. |
| 6,454,518 B1 | 9/2002 | GBarcia-Balleza et al. |
| 6,520,734 B2 | 2/2003 | Longoria et al. |
| 6,585,477 B1 | 7/2003 | Lawrence |
| 6,629,894 B1 | 10/2003 | Purton |
| 6,634,483 B1 | 10/2003 | Longoria |
| 7,104,388 B2 * | 9/2006 | Walker .......................... 198/433 |
| 7,190,813 B2 | 3/2007 | Daley et al. |
| 7,736,121 B2 | 6/2010 | Berger et al. |
| 7,860,277 B2 | 12/2010 | Mulder et al. |
| 8,002,513 B2 | 8/2011 | Malenjke et al. |
| 8,284,248 B2 | 10/2012 | Bourg, Jr. et al. |
| 8,424,430 B2 | 4/2013 | Malenke et al. |
| 9,014,434 B2 * | 4/2015 | Bajema et al. ................ 382/110 |

* cited by examiner

APPARATUS FOR CONVEYING, INSPECTING AND STACKING ITEMS

TECHNICAL FIELD

This application relates generally to packaging of stackable items and, more specifically, to an apparatus that conveys, inspects, sorts and stacks items, such as tortillas, paper plates or other generally planar items.

BACKGROUND

It is a goal in the food processing industry to reduce the cost of handling of products during manufacturing and packaging. For example, flexible, generally planar food products such as tortillas are generally discharged from a processing machine (e.g., an oven, a cooling device, or the like) in a randomly spaced sequence, then hand counted, inspected and stacked. Manually counting, inspecting, and stacking the tortillas is a significant portion of the cost of the tortillas. Further, the risk of human error in manually counting, inspecting, sorting out all of the defective products, and stacking the products is high. Such human error may result in, for example, a stack of tortillas having defective products therein, a low product count, or improperly stacked tortillas that can result in damage to the product. Further, executing the handling and packaging processes of manually inspecting, sorting, counting, and stacking greatly limits the speed at which the product can be packaged. Similar difficulties are encountered when handling other generally planar, stackable items, such as paper plates.

It would be desirable to provide an apparatus and method that facilitates handling and stacking of such items.

SUMMARY

In one aspect, a machine for inspecting, sorting and stacking items is provided. The machine includes a plurality of conveyor lanes for moving items through the machine. An imaging system is arranged relative to the conveyor lanes to view items moving along the conveyor lanes. A reject arrangement downstream of the imaging system includes a plurality of selectively actuatable reject mechanisms, each reject mechanism associated with a respective one of the conveyor lanes enabling items to be selectively dropped from each conveyor lane on an individual lane basis. A controller is associated with the imaging system and the reject arrangement. The controller operates to analyze image data for items moving along each conveyor lane and make a determination of whether any item is below a defined quality threshold and, if so, to identify the conveyor lane in which the item is moving and control the reject mechanism associated with the identified conveyor lane so as to operate to drop the below quality item out of the conveyor lane.

In another aspect, a method of inspecting, sorting and stacking items involves: conveying items along a plurality of conveyor lanes, each conveyor lane including an associated reject mechanism for selectively dropping items out of the conveyor lane; utilizing an imaging system arranged to view items moving along the plurality conveyor lanes to identify items that do not meet a defined quality threshold; if a given item in a specific conveyor lane does not meet the defined quality threshold, controlling the reject mechanism associated with the specific conveyor lane to cause the given item to be fed into a gap created in the conveyor lane by the reject mechanism so as to drop the given item out of the specific conveyor lane.

The details of one or more embodiments are set forth in the accompanying drawings and the description below. Other features, objects, and advantages will be apparent from the description and drawings, and from the claims.

DETAILED DESCRIPTION

For simplicity and illustrative purposes, the principles of the present apparatus and method are described by referring to various exemplary embodiments thereof. Although the illustrated embodiments are particularly disclosed herein, one of ordinary skill in the art will readily recognize that the same principles are equally applicable to, and can be implemented in other systems, and that any such variation would be within such modifications that do not part from the scope of the present application. Before explaining the disclosed embodiments in detail, it is to be understood that the invention is not limited in its application to the details of any particular arrangement shown, since the invention is capable of other embodiments. The terminology used herein is for the purpose of description and not of limitation. Further, although certain methods are described with reference to certain steps that are presented herein in certain order, in some instances, these steps may be performed in another order as would be appreciated by one skilled in the art, and the methods are not necessarily limited to the particular arrangement of steps disclosed herein.

Figure 1:
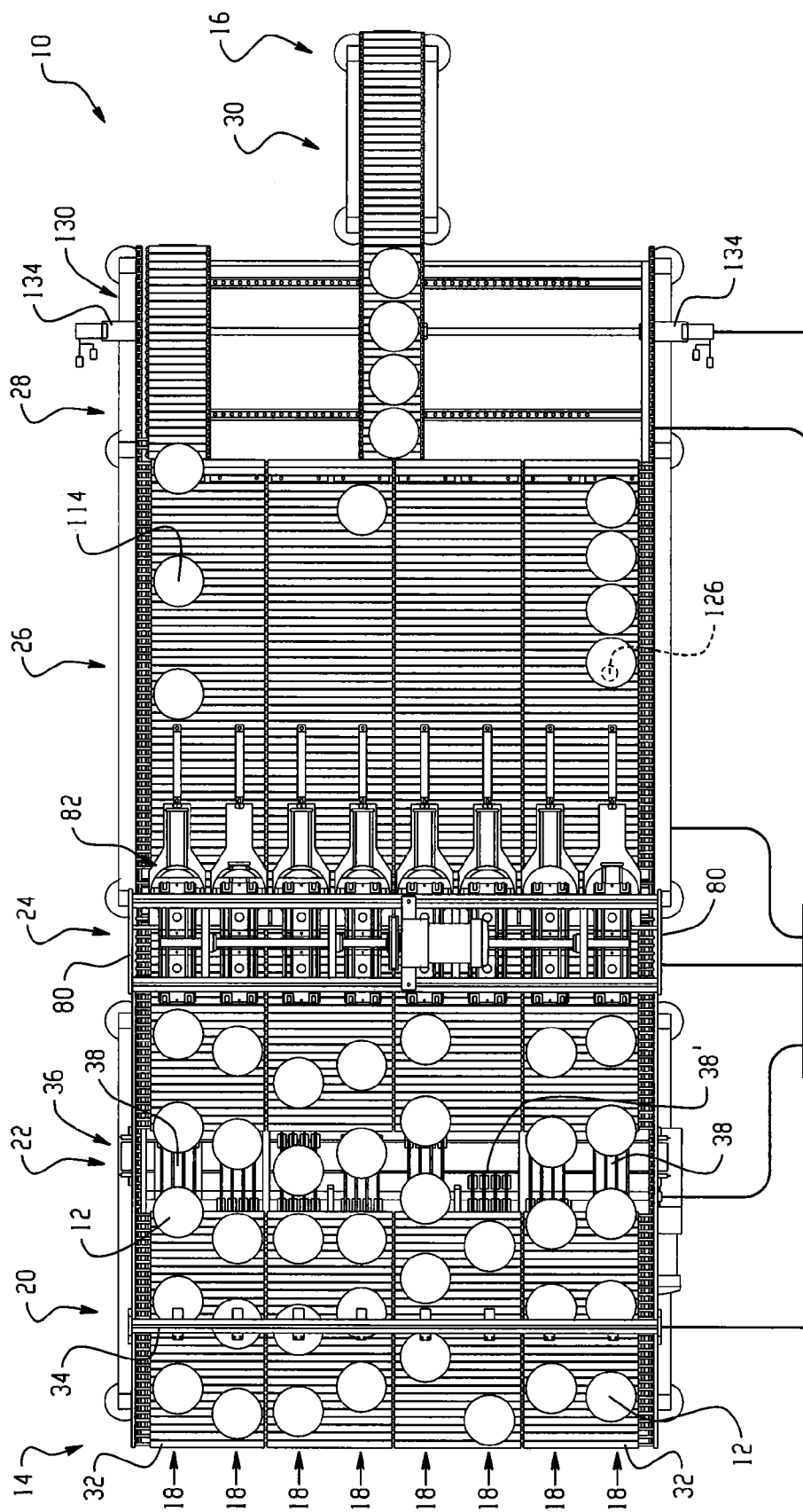
FIG. 1 is a top plan view of one embodiment of a inspecting, sorting and stacking machine.
Figure 2:
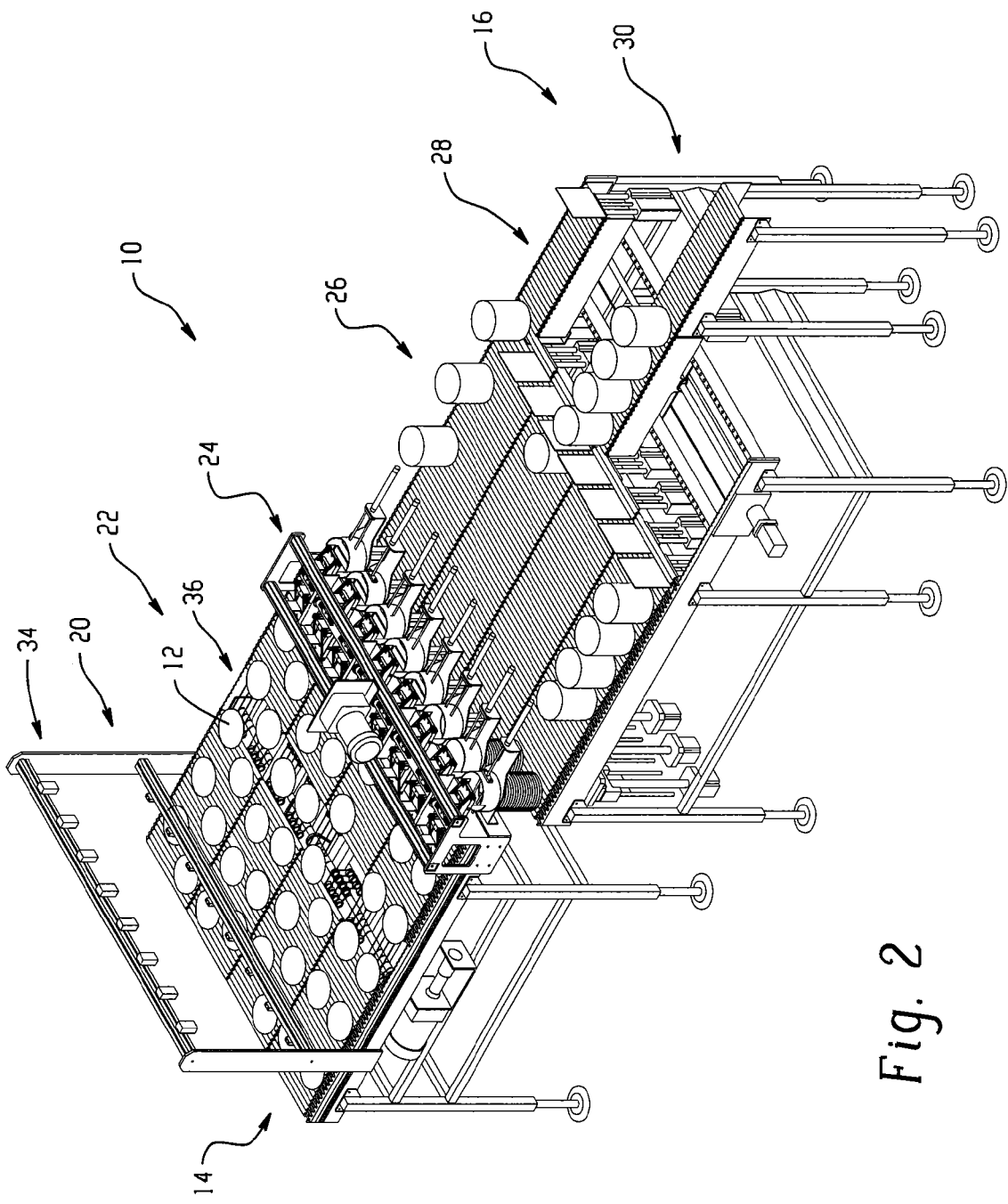
FIG. 2 is a perspective view of the machine of FIG. 1.

Referring to FIGS. 1 and 2, top plan and perspective views of a machine 10 for inspecting, sorting and stacking flexible, generally planar items 12 (e.g., such as tortilla or paper plates) is shown. The machine 10 includes an infeed end 14 and an outfeed end 16, with a plurality of conveyor lanes 18 (e.g., in the illustrated case eight, but the number could vary in other implementations) for moving items 12 through the machine. The machine generally includes an item inspection zone 20, an item reject zone 22, an item stacking zone 24, and item stack accumulation zone 26, an item stack transfer zone 28 and an item stack output zone 30.

In the inspection zone, items are conveyed along the conveyor lanes (e.g., via slip-torque conveyors that utilize rotatable but slippable rollers 32 with adjustable slip thresholds) past a imaging system 34 arranged above the conveyor lanes to view the items moving along the conveyor lanes. In the illustrated embodiment, each set of rollers 32 defines two conveyor lanes 18, but variations are possible. A reject arrangement 36 is provided downstream of the camera system in the reject zone 22. The reject arrangement includes a plurality of selectively actuatable reject mechanisms 38, where each reject mechanism 38 is associated with a respective one of the conveyor lanes 18, enabling items to be selectively dropped from each conveyor lane on an individual lane basis. In the illustrated view, just one reject mechanism 38' is shown in position to permit item drop from the conveyor lane. However, each reject mechanism is individually controlled and therefore the position status of each reject mechanism will vary according to the demands within its particular conveyor lane.

A controller 40 is associated with the camera system 34 and the reject arrangement 36. The controller is operable (e.g., by way of software, firmware, hardware and/or other logic and associated data stores as necessary) to analyze image data for items moving along each conveyor lane 18 and to make a determination of whether any item is below a defined quality threshold. If an item is below the quality threshold, the controller identifies the conveyor lane in which the item is moving and controls the reject mechanism 38 associated with the identified conveyor lane so as to operate to drop the below quality item out of the conveyor lane. Controller 40 is shown schematically in FIG. 1, and it is recognized that the controller 40 could be single unit (e.g., a single processor-based unit handling all machine zones) or could be formed by multiple interconnected units (e.g., multiple processor-based units, where each unit is assigned to one or more particular zones).

Figure 3:
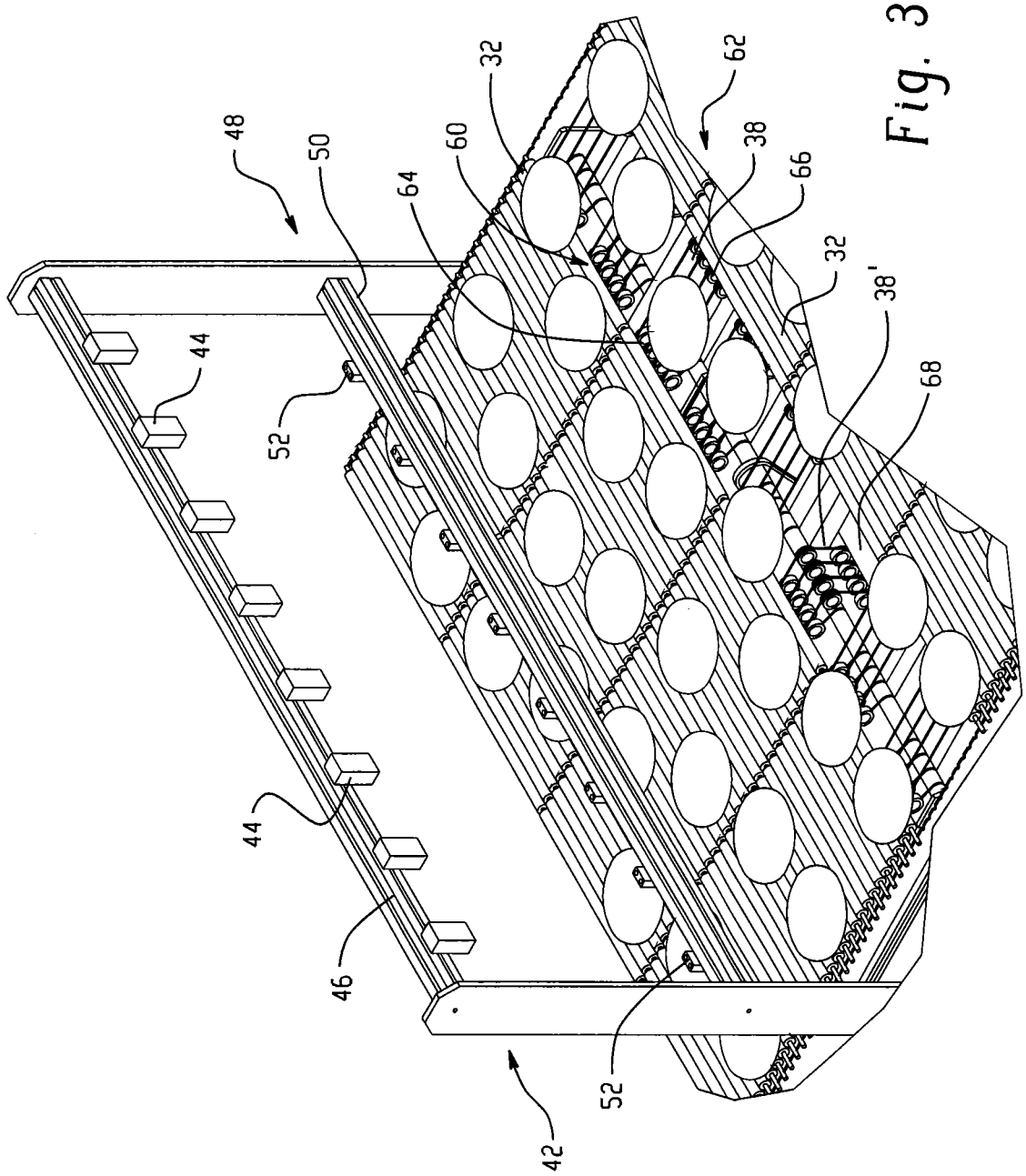
FIG. 3 is an partial perspective view of the item inspection zone and reject zone of the machine of FIG. 1.

As best seen in the partial perspective view of FIG. 3, the imaging system 34 includes an overhead camera arrangement 42 extending transversely across the conveyor lanes. The overhead camera arrangement includes a plurality of camera modules 44 (e.g., mounted at the upstream side of a transverse rail 46), where each camera module 44 is associated with a respective one of the conveyor lanes. The vision field of each camera module is sufficient to cover the entire width of the conveyor lane with which it is associated. As mentioned above, the controller 40 makes a determination of whether any item is below a defined quality threshold. In this regard, the controller may be configured to utilize the image data from each camera module 44 to make such a determination. By way of example, the defined quality threshold may involve a plurality of characteristics including one or more of (i) item diameter, (ii) item perimeter shape, (iii) item size, (iv) item continuity within the item perimeter (e.g., identifying holes or tears), (v) item color and/or shading or (vi) item position along the conveyor lane (e.g., identifying an item that will not stack properly due to improper lateral offset). Other variations of quality characteristics could also be utilized.

As also seen in FIG. 3, an item count system 48 may be included in the machine. Specifically, a transverse overhead rail 50 includes detectors 52 (e.g., photo-sensors) mounted at its upstream side, one for each conveyor lane, for use in counting the number of items passing along the conveyor lane. This count can be used by the controller 40, for example, in order to assure that the proper number of items are stacked downstream.

The reject arrangement is also seen in FIG. 3, where each conveyor lane includes a reject mechanism 38, which in the illustrated embodiment takes the form of a pull nose belt conveyor unit. Each pull nose belt conveyor unit includes an infeed end 60 and an outfeed or nose end 62. The position of the rotating belt rollers 64 at the infeed end is fixed. However, the rotating belt rollers 66 at the outfeed end are movable between a pass position and a reject position. The pass position is adjacent the downstream slip rollers 32 in order to provide continuity of the conveying surface or conveying plane 67 (FIGS. 4a and 4b) of the conveyor lane, allowing items to pass freely along the conveyor lane. The reject position is located toward the infeed end 62, as shown in the case of reject mechanism 38', in order to create a drop out gap 68 in the conveyor lane through which items are dropped for purpose of reject. In this regard, and by way of example only, the items may be dropped onto another conveyor (e.g., feeding to a recycling path) or into a temporary storage container or bin. Each pull nose conveyor unit includes an associated linear actuator for controlling the position of the outfeed end. By way of example, the linear actuator may be pneumatic or servo driven, but other variations of actuators are possible. The controller 40 controls the actuator based upon the below quality determination discussed above. In this regard, the reject mechanisms may be set up as defaulted to either the reject position of the pass position. In the instance of the default reject position, the controller 40 is configured to control the actuator to temporarily move the movable rollers 66 from the reject position to the pass position for each item that meets the defined quality threshold. By contrast, in the case of the default pass position, the controller 40 is configured to control the actuator to temporarily move the movable rollers from the pass position to the reject position for each item that is below the defined quality threshold.

Figure 4A:
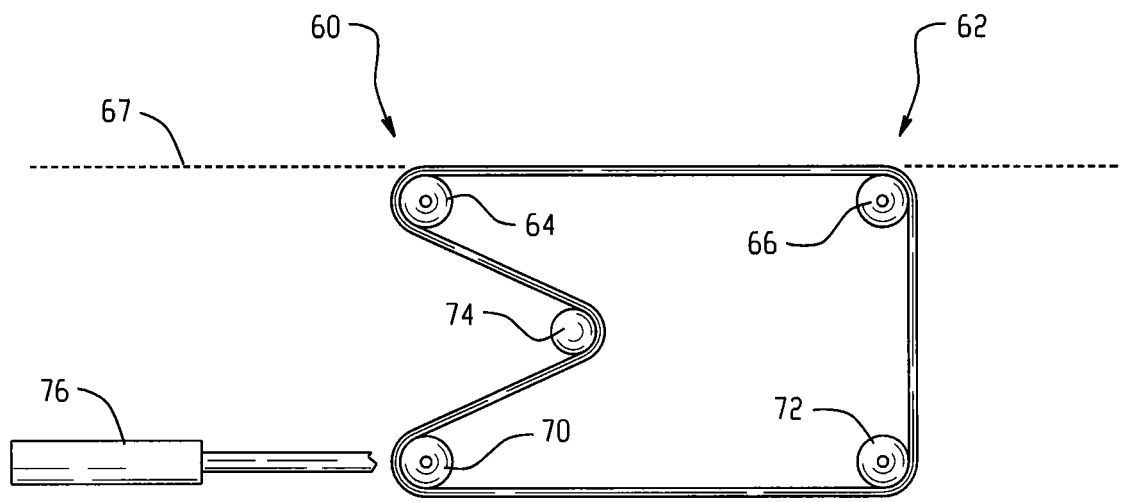
FIGS. 4a and 4b are schematic side elevation views of the reject mechanism used in the reject zone of the machine of FIG. 1.
Figure 4B:
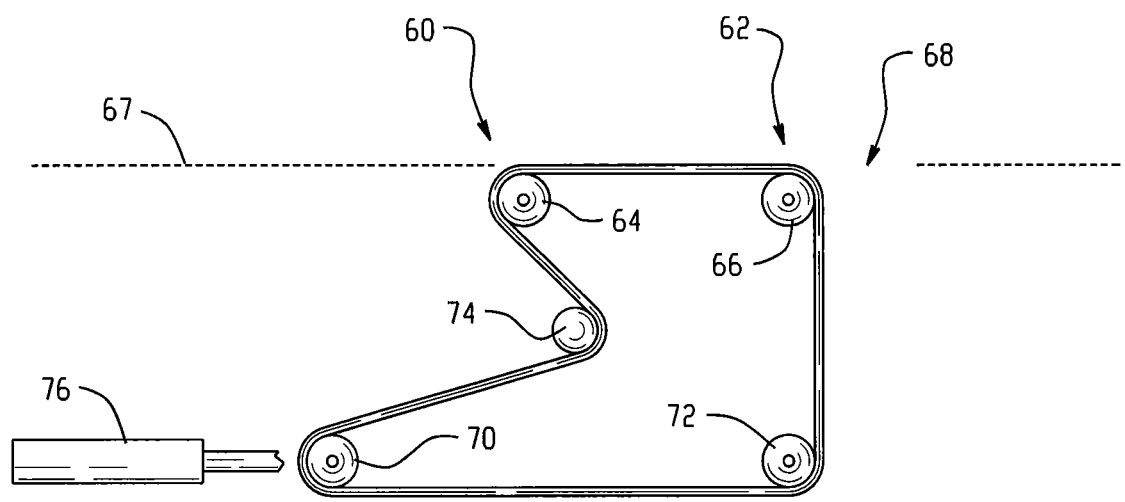

Referring to FIGS. 4a and 4b, a schematic side view representation of a reject mechanism in both the pass position and the reject position. As shown, the overall roller arrangement is such that no slack is created in the belt drive arrangement as a result of roller movement because, in addition to rollers 66, roller sets 70 and 72 are also moved, while roller set 64 and rotating belt guide rod 74 remain stationary. The exemplary linear actuator 76 is also shown in FIGS. 4a and 4b. Notably, during machine operation, the belts of the pull nose conveyors are continuously moving regardless of the position of the outfeed end of the conveyor, and therefore the belts help pass or throw items being rejected down into the gap.

Figure 5:
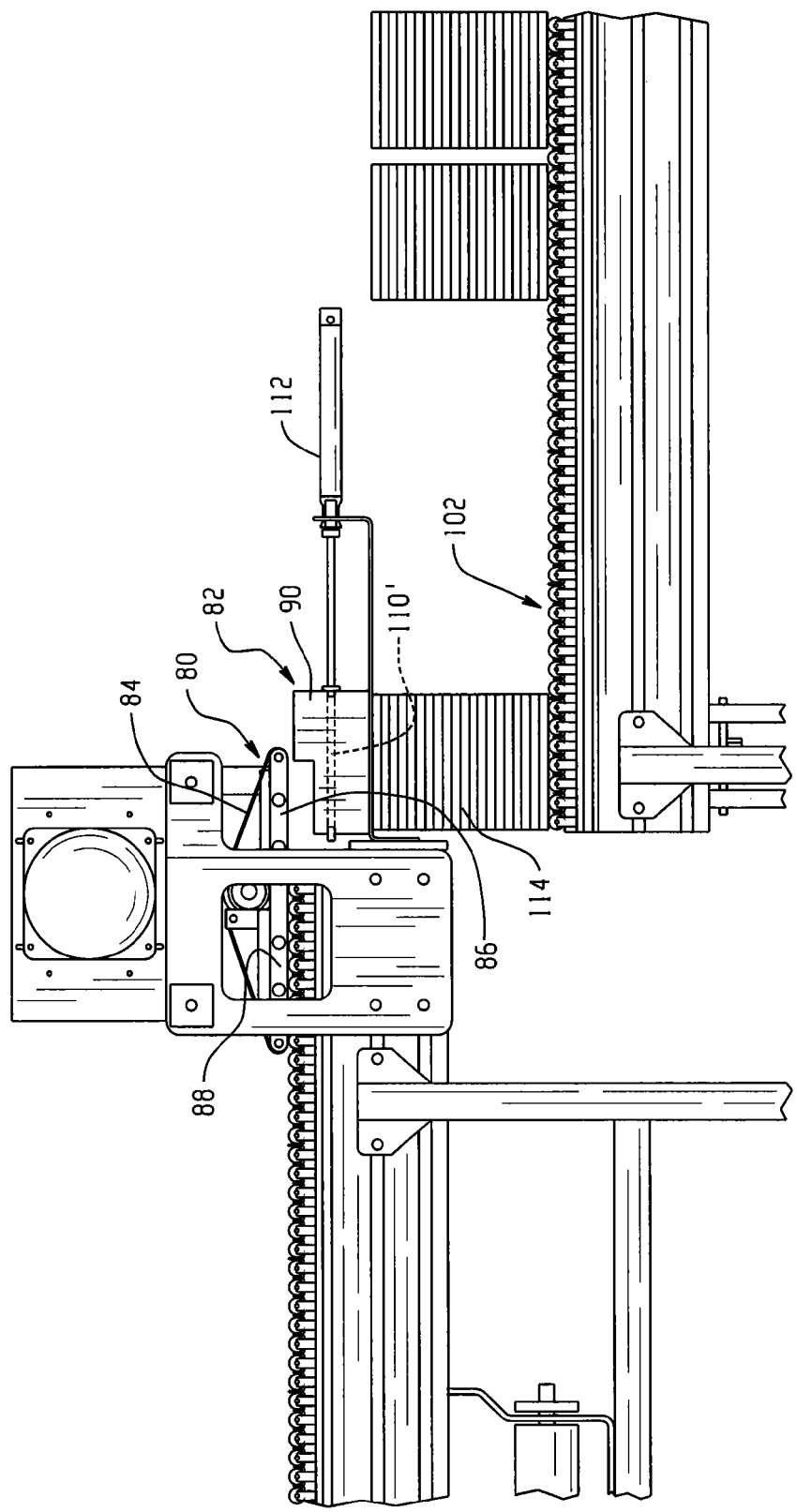
FIG. 5 is a partial side elevation view of a stacking zone of the machine of FIG. 1.

Referring to FIGS. 1 and 5-8, items that pass inspection continue to move down the conveyor lanes (e.g., via the slip-torque conveyors) toward the item stacking zone 24. In the illustrated embodiment, each conveyor lane includes an overhead conveyor 80 at the upstream side of the stacking mechanism 82. The overhead conveyor may, by way of example, be formed by an overhead vacuum assisted belt conveyor in which the belts 84 run along a downwardly facing surface 86 of a vacuum plate 88, with the plate having openings drawing a vacuum to cause the items to be held upward against the belts 84. Each plate may include its own independent vacuum pump, but variations are possible, such as a pump that pulls the vacuum for multiple plates. As seen in FIG. 5, an upstream part of the overhead conveyor 80 overlies the slip torque conveyor and a downstream part of the overhead conveyor is extends outward beyond the end of the slip-torque conveyor and over the top of at least part of the stacking mechanism 82. Thus, the items are transferred from the slip-torque conveyor to the overhead conveyor for the purpose of facilitating the stacking operation.

Figure 6:
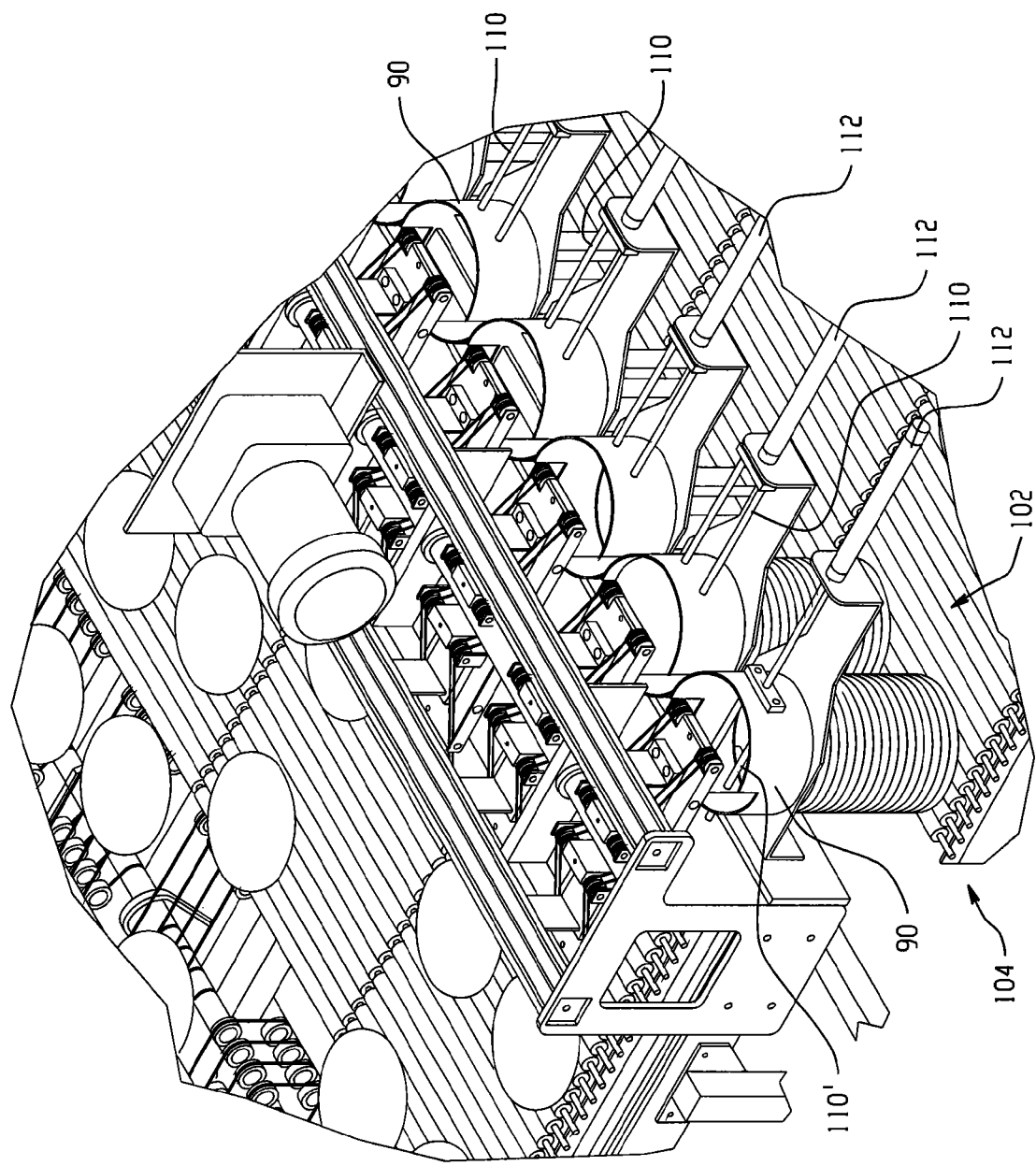
FIG. 6 is a is a partial perspective view of the stacking zone.
Figure 7:
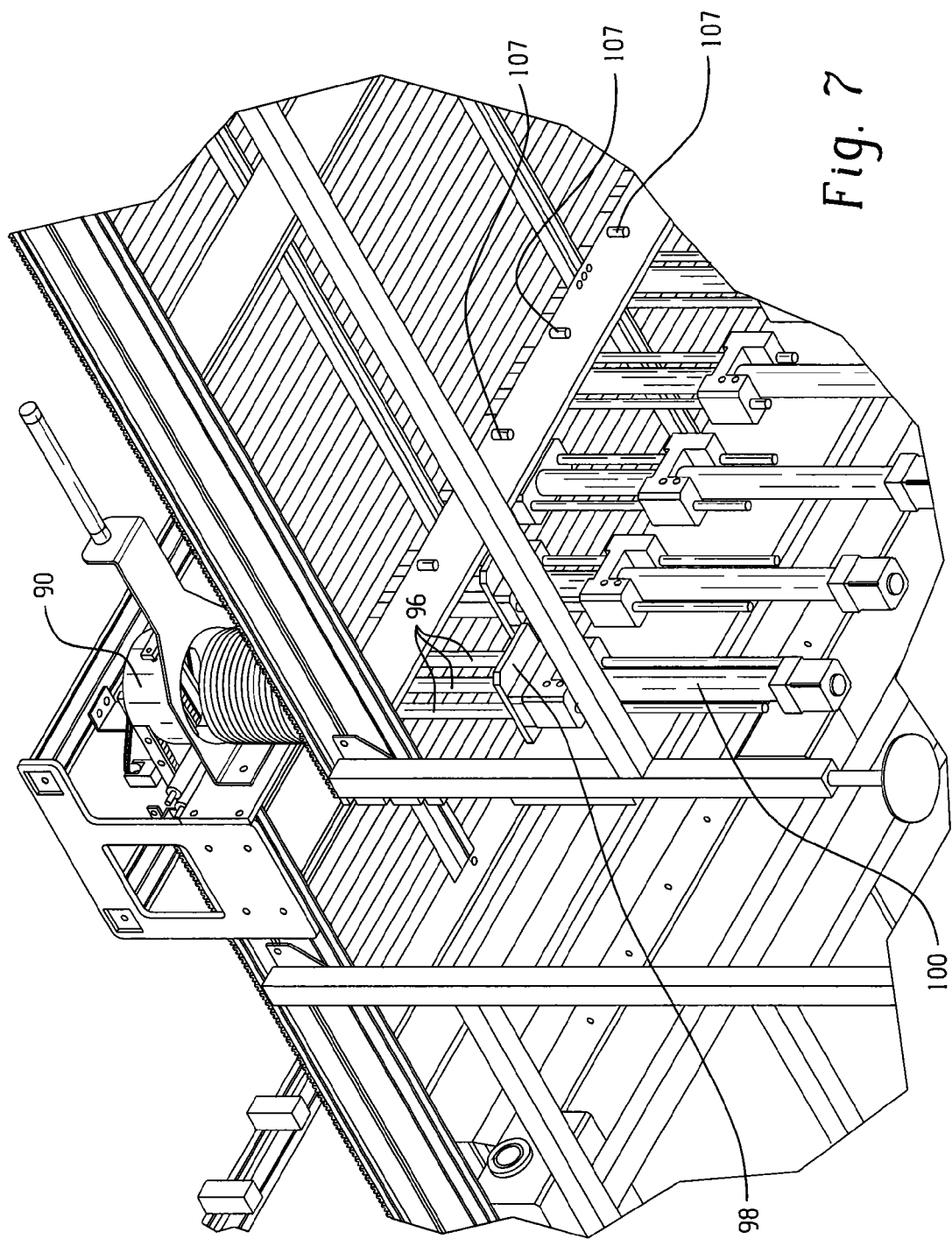
FIG. 7 is a partial perspective view of the stacking zone from below the conveyor path.
Figure 8:
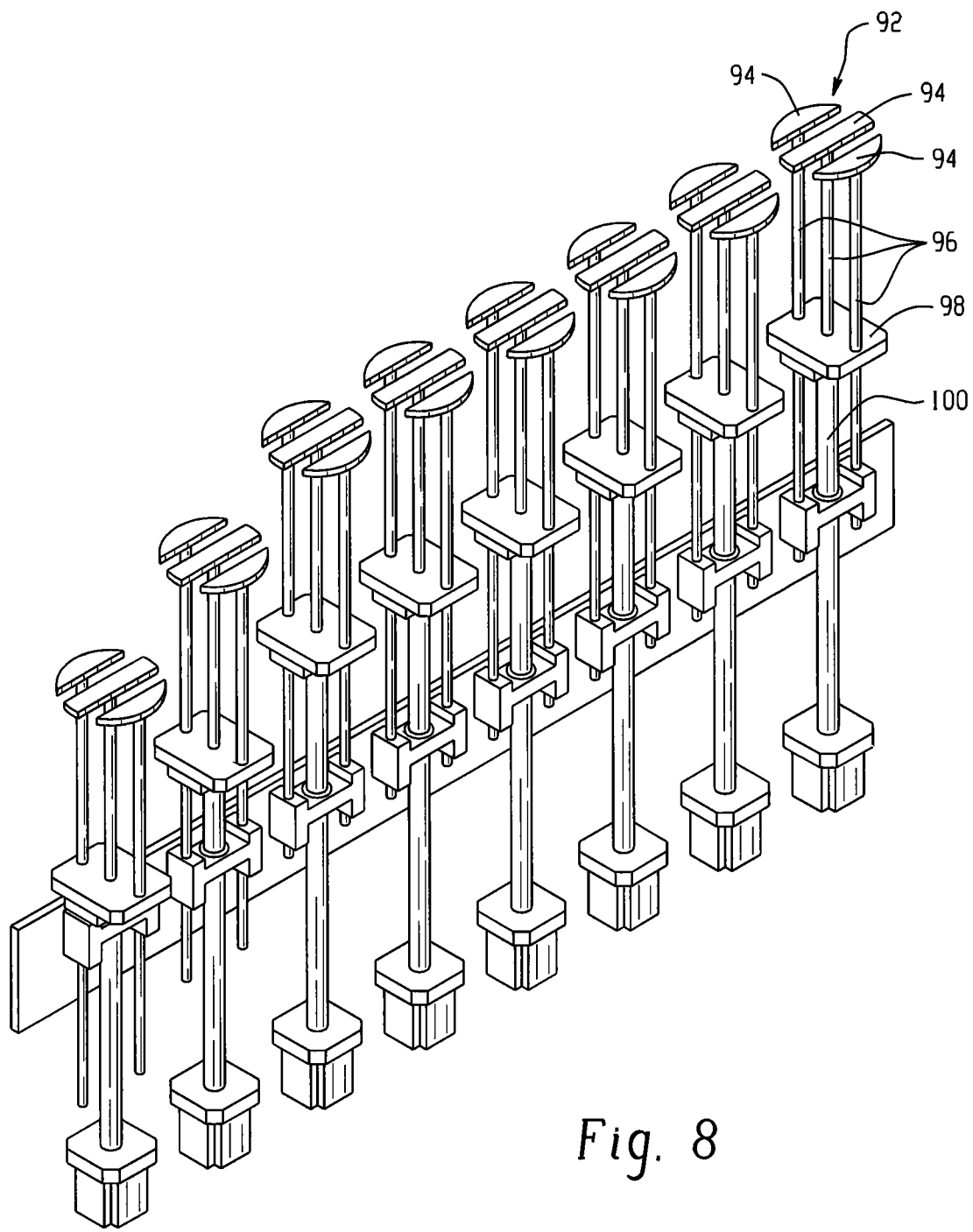
FIG. 8 is a partial perspective view of the stack supports used in the stacking zone.

The stack mechanism 82 of each conveyor lane includes a stacking cylinder 90 into which items are dropped from the downstream end of overhead conveyor 80 for stacking. In this regard, the vacuum assist at the downstream or drop end of each overhead conveyor is reduced in order to enhance item drop into the stacking cylinder 90. This affect may be achieved by progressively reducing the number of vacuum openings toward the downstream end of the plate 88. A vertically movable stack support 92 (FIG. 8) is positioned within each stacking cylinder 90 and is initially positioned at a height suitable to received items dropped from the overhead conveyor (e.g., without causing damage to the items). The stack support 92 may be configured as a stack grid with multiple spaced apart support plates 94, each connected to respective rods 96 that are in turn connected to a common plate 98 that is moved upward and downward by a linear actuator 100 (e.g., pneumatic or servo controlled). The stack support 92 is initially positioned in an upward location within the stacking cylinder as mentioned above. As items are progressively stacked, the stack support 92 is progressively moved downward such that the stack moves downward below the bottom edge of the stacking cylinder 90, toward a stack conveyor 102 (FIG. 6). The stack conveyor 102 may also be formed as a slip-torque conveyor with slippable rollers, where the rollers immediately below the stacking cylinder 90 at a transfer location 104 include a spacing through which the support plates 94 of the stack grid can pass in order to transfer the stack down onto the stack conveyor 102. A photo-detector arrangement (e.g., shown schematically at 103 in FIG. 7) detects when an item stack has been conveyed out of the transfer location, and the controller 40 then effects movement of the stack support 92 back upward into the stacking cylinder 90 for the purpose of receiving the next item stack.

In order to assure a more continuous stacking operation, each stacking cylinder includes an associated stack rail 110 that is movable between a catch position in the cylinder, per stack rail 110' shown in FIG. 6, and a retracted position per the other stack rails 110 shown in FIG. 6. In the illustrated embodiment, each stack rail is configured as two rods that align with an extend through openings in the stacking cylinder 90. However, numerous configurations are possible for the stack rail, such as a rail providing a continuous planar surface are some other form of discontinuous structure, provided only that the stack rail is sufficient to support the items within the stacking cylinder 90.

The stack rails 110 may be individually and selectively moved by respective actuators 112 (e.g., pneumatic or servo controlled). The controller 40 is configured to effect movement of the stack rail 110 from the retracted position to the catch position when an item stack 114 has been completed (e.g., as determined by an item count), so that as the stack support transfers the item stack down to the stack conveyor 102, incoming items to the stack cylinder 90 may begin to stack on the stack rail 110. Likewise, the controller 40 is configured to effect movement of the stack rail 110 from the catch position to the retract position when the stack support 92 has completed the item stack transfer to the stack conveyor 102 and moved back upward into position within the stacking cylinder 90. This movement of the stack rail causes stacked items within the stacking cylinder 90 to be transferred onto the stack support 92, which can again begin progressively moving downward as the stack size increases. In certain embodiments, each stack mechanism may also include an associated detector arrangement to detect when an item stack has been completed (e.g., rather than using an item count, a stack height is detected).

Figure 9:
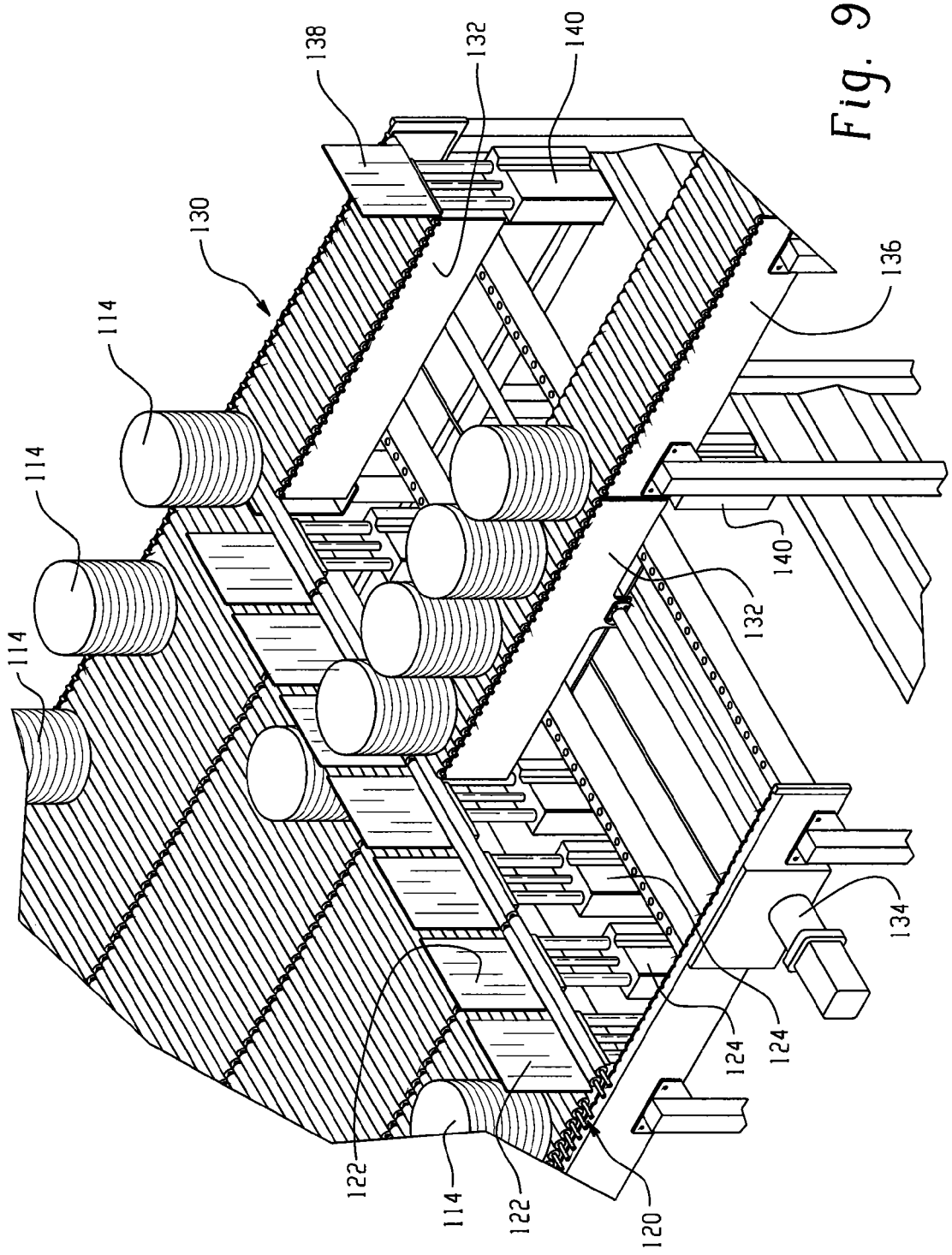
FIG. 9 is a partial perspective view of the transfer zone and output zone of the machine of FIG. 1.

As noted above, the stacking mechanism of each conveyor lane transfers item stacks 114 to a stack conveyor 102. In the illustrated embodiment, per FIG. 9, each set of stack conveyor rollers (e.g., slippable) is wide enough to handle two conveyor lanes, similar to the slip-torque conveyors upstream of the stacking mechanisms. However, variations are possible. The stack conveyors 102 have a discharge end 120 with a movable stop 122 at the end of each conveyor lane. Item stacks 114 carried by the stack conveyor accumulate on the stack conveyor adjacent the movable stop 122 (e.g., the slip-torque conveyors keep operating and item stacks are simply pushed adjacent the stop or adjacent and immediately downstream item stack). In the illustrated embodiment, the stops 122 are form by vertically movable plate members that can be actuated for vertically downward movement, and subsequent return upward movement, by respective actuators 124 (e.g., pneumatic or servo controlled). A detector arrangement may be provided for detecting when a select number of item stacks have accumulated on the stack conveyor. By way of example, a photo-detector 126 (shown schematically in FIG. 1) positioned beneath the stack conveyor in each conveyor lane may be used for detecting stacks upwardly through the space between the conveyor rollers. Alternatively, the detector arrangement could be incorporated within the controller by way of maintaining a count of item stacks that leave the transfer location, in combination with a delay sufficient to assure that the last item stack reaches the preceding item stack. A side transfer conveying system 130 is located downstream of the stops 122. In the illustrated embodiment, two laterally movable transfer conveyors 132 are provided (e.g., each for handling four of the eight conveyor lanes). The transfer conveyors 132 can be aligned with any one of a multiplicity of the conveyor lanes (e.g., any one of four). In the illustrated embodiment, each laterally movable transfer conveyor 132 is movable by a respective actuator 134.

In operation, the controller 40 is operable to respond to an output of the detector arrangement of a given conveyor lane indicating accumulation of the select number of item stacks by effecting movement of the transfer conveyor 132 into alignment with the given conveyor lane and, upon such alignment, release (e.g., downward movement in the illustrated arrangement) of the stop 122 to allow the accumulated item stacks to feed onto the transfer conveyor 132. The transfer conveyor 132 is then shifted laterally into alignment with the output conveyor 136 to feed the item stacks to the output conveyor 136. In this regard, the transfer conveyors 132 may include downstream stops 138 with associated actuators 140 (e.g., similar to stops 122) which are moved downward upon alignment of the transfer conveyor with the output conveyor 136. Alternatively, or in addition, the transfer conveyors 132 may be selectively operated for item stack feed so as to prevent item stacks from moving off the output end of the transfer conveyor until the transfer conveyor has been laterally moved into alignment with the output conveyor 136. In such cases, the transfer conveyor rollers would be stationary as the transfer conveyor is moved laterally into position for alignment with the output conveyor.

The above described machine removes out of spec products/items prior to stacking, allowing for improved stack integrity and reduced machine down time. The stack accumulation and combining to a single lane discharge will reduce the labor time currently associated with packaging items.

Slip-torque conveyors for moving items through the machine may include low-backpressure roller conveyors. Slip-torque conveyors used in the machine may have a configurable roller surface relating to positive drive, speed, color, and roller material. Slip-torque conveyors used in the machine may also include segmented rollers for below surface lane guide mounting and open conveyor surfaces for underneath mounting of devices.

Cameras in the machine may be used for verifying that items are the correct size, not deformed, do not have holes or dark spots, are in correct position and not overlapping other products causing stacking issues. The cameras also may be used for counting the stack and tracking of product through the system, although separate detectors may be provided for this purpose as indicated above.

The pull nose reject device may be pneumatic and servo driven depending on rates required. The reject devices and cameras assure all items reaching the stacker conform to the quality needed for system operation.

It is to be clearly understood that the above description is intended by way of illustration and example only, is not intended to be taken by way of limitation, and that other changes and modifications are possible.

What is claimed is:

1. A machine for inspecting, sorting and stacking items, the machine comprising:
    a plurality of conveyor lanes for moving items through the machine;
    an imaging system arranged relative to the conveyor lanes to view items moving along the conveyor lanes;
    a reject arrangement downstream of the imaging system, the reject arrangement including a plurality of selectively actuatable reject mechanisms, each reject mechanism associated with a respective one of the conveyor lanes enabling items to be selectively dropped from each conveyor lane on an individual lane basis;
    a controller associated with the imaging system and the reject arrangement, the controller operable to analyze image data for items moving along each conveyor lane and make a determination of whether any item is below a defined quality threshold and, if so, to identify the conveyor lane in which the item is moving and control the reject mechanism associated with the identified conveyor lane so as to operate to drop the below quality item out of the conveyor lane;
    wherein each selectively actuatable reject mechanism comprises a retractable belt conveyor unit in part defining the conveyor lane, and having an end movable between a reject orientation and a pass orientation, in the reject orientation a drop out gap is created in the conveyor lane through which items can be dropped for purpose of reject, in the pass orientation the drop out gap is eliminated enabling items to pass along the conveyor lane;
    a stacking system downstream of the reject arrangement for receiving items that were not rejected;
    a stack accumulation system downstream of the stacking system; and
    a side transfer conveying system downstream of the stack accumulation system and having at least one laterally movable transfer conveyor that can be aligned with any one of a multiplicity of the conveyor lanes.

2. The machine of claim 1, further comprising:
    the stacking system including a plurality of selectively controllable stack mechanisms, each stack mechanism associated with a respective one of the conveyor lanes to facilitate production of an item stack of defined size for each conveyor lane.

3. The machine of claim 2, further comprising:
    the stack accumulation system including a plurality of selectively movable stops, each stop associated with a respective one of the conveyor lanes;
    the controller controlling each of the movable stops to allow item stacks to accumulate in each conveyor lane before the stop is released to enable further movement of the stacks.

4. A machine for inspecting, sorting and stacking items, the machine comprising:
    a plurality of conveyor lanes for moving items through the machine;
    an imaging system arranged relative to the conveyor lanes to view items moving along the conveyor lanes;
    a reject arrangement downstream of the imaging system, the reject arrangement including a plurality of selectively actuatable reject mechanisms, each reject mechanism associated with a respective one of the conveyor lanes enabling items to be selectively dropped from each conveyor lane on an individual lane basis;
    a controller associated with the imaging system and the reject arrangement, the controller operable to analyze image data for items moving along each conveyor lane and make a determination of whether any item is below a defined quality threshold and, if so, to identify the conveyor lane in which the item is moving and control the reject mechanism associated with the identified conveyor lane so as to operate to drop the below quality item out of the conveyor lane;
    a stacking system downstream of the reject arrangement for receiving items that were not rejected, the stacking system including a plurality of selectively controllable stack mechanisms, each stack mechanism associated with a respective one of the conveyor lanes to facilitate production of an item stack of defined size for each conveyor lane;
    a stack accumulation system downstream of the stacking system, the stack accumulation system including a plurality of selectively movable stops, each stop associated with a respective one of the conveyor lanes;
    the controller controlling each of the movable stops to allow item stacks to accumulate in each conveyor lane before the stop is released to enable further movement of the stacks;
    a side transfer conveying system downstream of the stack accumulation system and having at least one laterally movable transfer conveyor that can be aligned with any one of a multiplicity of the conveyor lanes;
    wherein the controller is configured to effect movement of the laterally movable transfer conveyor into alignment with a given conveyor lane before releasing the stop associated with the given conveyor lane such that upon release of the stop of the given conveyor lane the accumulated item stacks of the given conveyor lane are moved onto the laterally movable conveyor.

5. The machine of claim 4, further comprising:
    an output conveyor downstream of the side transfer conveying system;
    wherein the controller is operable to effect movement of the laterally movable transfer conveyor with the accumulated item stacks from the given conveyor lane out of alignment with the given conveyor lane and into alignment with the output conveyor and, upon such alignment with the output conveyor, to effect operation of the laterally movable transfer conveyor to feed the accumulated stacks onto the output conveyor.

6. The machine of claim 1 wherein the imaging system comprises an overhead camera arrangement extending transversely across the conveyor lanes, the overhead camera arrangement including a plurality of camera modules, each camera module associated with a respective one of the conveyor lanes.

7. The machine of claim 6 wherein the controller is configured such that the defined quality threshold involves a plurality of characteristics including one or more of (i) item diameter, (ii) item perimeter shape, (iii) item size, (iv) item continuity within the item perimeter, (v) item color and/or shading or (vi) item position along the conveyor lane.

8. A machine for inspecting, sorting and stacking items, the machine comprising:
    a plurality of conveyor lanes for moving items through the machine;

an imaging system arranged relative to the conveyor lanes to view items moving along the conveyor lanes;

a reject arrangement downstream of the imaging system, the reject arrangement including a plurality of selectively actuatable reject mechanisms, each reject mechanism associated with a respective one of the conveyor lanes enabling items to be selectively dropped from each conveyor lane on an individual lane basis;

a controller associated with the imaging system and the reject arrangement, the controller operable to analyze image data for items moving along each conveyor lane and make a determination of whether any item is below a defined quality threshold and, if so, to identify the conveyor lane in which the item is moving and control the reject mechanism associated with the identified conveyor lane so as to operate to drop the below quality item out of the conveyor lane;

wherein each selectively actuatable reject mechanism comprises a retractable belt conveyor unit in part defining the conveyor lane, the retractable belt conveyor unit including a plurality of rollers defining a belt path of the retractable belt conveyor unit, including a set of fixed rollers and a set of movable rollers movable between a reject position and a pass position via an actuator of the retractable belt conveyor unit, when the movable rollers are in the reject position a drop out gap is created in the conveyor lane through which items can be dropped for purpose of reject, when the movable rollers are in the pass position the drop out gap is eliminated enabling items to pass along the conveyor lane.

9. The machine of claim 8 wherein each retractable belt conveyor unit is set up in either:
   (i) a default reject position, wherein the controller is configured to control the actuator to temporarily move the movable rollers from the reject position to the pass position for each item that meets the defined quality threshold; or
   (ii) a default pass position, wherein the controller is configured to control the actuator to temporarily move the movable rollers from the pass position to the reject position for each item that is below the defined quality threshold.

10. A machine for inspecting, sorting and stacking items, the machine comprising:
    a plurality of conveyor lanes for moving items through the machine;
    an imaging system arranged relative to the conveyor lanes to view items moving along the conveyor lanes;
    a reject arrangement downstream of the imaging system, the reject arrangement including a plurality of selectively actuatable reject mechanisms, each reject mechanism associated with a respective one of the conveyor lanes enabling items to be selectively dropped from each conveyor lane on an individual lane basis;
    a controller associated with the imaging system and the reject arrangement, the controller operable to analyze image data for items moving along each conveyor lane and make a determination of whether any item is below a defined quality threshold and, if so, to identify the conveyor lane in which the item is moving and control the reject mechanism associated with the identified conveyor lane so as to operate to drop the below quality item out of the conveyor lane;
    a stacking system downstream of the reject arrangement for receiving items that were not rejected, the stacking system including a plurality of selectively controllable stack mechanisms, each stack mechanism associated with a respective one of the conveyor lanes to facilitate production of an item stack of defined size for each conveyor lane;
    a stack accumulation system downstream of the stacking system and in which:
      each conveyor lane includes:
        an associated stack conveyor downstream of the stack mechanism, the stack conveyor having a discharge end with a movable stop, wherein item stacks carried by the stack conveyor accumulate on the stack conveyor adjacent the movable stop;
        a detector arrangement for detecting when a select number of item stacks have accumulated on in the conveyor lane;
      a side transfer conveying system is located downstream of the stops and has at least one laterally movable transfer conveyor that can be aligned with any one of a multiplicity of the conveyor lanes;
    wherein the controller is operable to respond to an output of the detector arrangement of a given conveyor lane indicating accumulation of the select number of item stacks by effecting movement of the transfer conveyor into alignment with the given conveyor lane and, upon such alignment, release of the stop to allow the accumulated item stacks to feed onto the transfer conveyor.

11. The machine of claim 10 wherein the transfer conveyor is arranged with a releasable stop at its output end and/or is selectively operated for item stack feed so as to prevent item stacks from moving off the output end of the transfer conveyor until the transfer conveyor has been laterally moved into alignment with an output conveyor.

12. A method of inspecting, sorting and stacking items, the method comprising:
    conveying items along a plurality of conveyor lanes, each conveyor lane including an associated reject mechanism for selectively dropping items out of the conveyor lane;
    utilizing an imaging system arranged to view items moving along the plurality conveyor lanes to identify items that do not meet a defined quality threshold;
    if a given item in a specific conveyor lane does not meet the defined quality threshold, controlling the reject mechanism associated with the specific conveyor lane to cause the given item to be fed into a gap created in the conveyor lane by the reject mechanism so as to drop the given item out of the specific conveyor lane;
    utilizing a stacking mechanism associated with each conveyor lane downstream of the reject mechanism of each conveyor lane to stack items traveling along the conveyor lane that meet the defined quality threshold into stacks of acceptable count or size;
    conveying item stacks formed in each conveyor lane downstream along the conveyor lane to an accumulation zone;
    upon accumulation of a suitable number of item stacks in a particular conveyor lane:
      laterally moving a transfer conveyor into alignment with the particular conveyor lane;
      loading the item stacks onto the transfer conveyor;
      laterally moving the transfer conveyor with item stacks thereon into alignment with an output conveyor; and
    loading the item stacks onto the output conveyor.

13. The method of claim 12 wherein the defined quality threshold involves a plurality of characteristics including one or more of (i) item diameter, (ii) item perimeter shape, (iii) item size, (iv) item continuity within the item perimeter, (v) item color and/or shading or (vi) item position along the conveyor lane.

14. The method of claim 12 wherein the number of conveyor lanes is at least six, and a single output conveyor is provided for receiving item stacks from the six conveyor lanes.

15. The method of claim 14 wherein the imaging system is formed by an overhead camera system that provides a camera module for each conveyor lane.

16. A method of inspecting, sorting and stacking items, the method comprising:
- conveying items along a plurality of conveyor lanes, each conveyor lane including an associated reject mechanism for selectively dropping items out of the conveyor lane;
- utilizing an imaging system arranged to view items moving along the plurality conveyor lanes to identify items that do not meet a defined quality threshold;
- if a given item in a specific conveyor lane does not meet the defined quality threshold, controlling the reject mechanism associated with the specific conveyor lane to drop the given item out of the specific conveyor lane;
- utilizing a stacking mechanism along each conveyor lane downstream of the reject mechanism of the conveyor lane to create item stacks within the conveyor lane;
- conveying item stacks formed in each conveyor lane downstream along the conveyor lane to an accumulation zone;
- upon accumulation of a suitable number of item stacks in a particular conveyor lane:
  - laterally moving a transfer conveyor into alignment with the particular conveyor lane;
  - loading the item stacks onto the transfer conveyor;
  - laterally moving the transfer conveyor with item stacks thereon into alignment with an output conveyor; and
  - loading the item stacks onto the output conveyor.

* * * * *